United States Patent [19]

Raviola

[11] 4,424,330

[45] Jan. 3, 1984

[54] ETHYLENE-PROPYLENE COPOLYMERS

[75] Inventor: Florent Raviola, Verquin, France

[73] Assignee: Societe Chimique des Charbonnages, Paris, France

[21] Appl. No.: 267,592

[22] Filed: May 27, 1981

[30] Foreign Application Priority Data

May 28, 1980 [FR] France ................................ 80 11775

[51] Int. Cl.³ .......................................... C08F 210/16
[52] U.S. Cl. .................................... 526/348; 526/125;
526/348.2; 526/348.5; 526/348.6; 526/916
[58] Field of Search .................. 526/348, 348.2, 348.6,
526/348.5

[56] References Cited

U.S. PATENT DOCUMENTS

| 3,422,055 | 1/1969 | Maloney | 260/41 |
| 3,981,849 | 9/1976 | Frese et al. | 526/82 |
| 4,128,607 | 12/1978 | Shiomura et al. | 260/878 B |

FOREIGN PATENT DOCUMENTS 5394 11/1979 European Pat. Off. .
25761 3/1981 European Pat. Off. .
1355245 6/1974 United Kingdom .

Primary Examiner—Stanford M. Levin
Attorney, Agent, or Firm—Finnegan, Henderson, Farabow, Garrett & Dunner

[57] ABSTRACT

A copolymer based on ethylene and propylene, having a density of between 0.933 and 0.946 g/cm³ and a melt index of between 2 and 10 dg/min, wherein the copolymer has from 3 to 27 alkyl groups per 1000 carbon atoms in the molecule and wherein its density $\rho$ and its proportion m of alkyl groups in the molecule satisfy the relationship $0.948 \leq \rho + 0.71 \, m \leq 0.9525$. The copolymer is produced by feeding a flux comprising from 80 to 95% by weight of ethylene and from 5 to 20% by weight of propylene into at least one reactor in stationary operation, the reactor having at least one reaction zone; and copolymerizing the ethylene and propylene in the reactor at a pressure of from 300 to 2500 bar and a temperature of from 180° to 320° C. in the presence of a Ziegler type catalyst system.

7 Claims, 1 Drawing Figure

ETHYLENE-PROPYLENE COPOLYMERS

The present invention relates to the copolymerization of ethylene and of α-olefin monomers, copolymerizable with ethylene, particularly with a view to obtaining copolymers having a density of between 0.933 and 0.946 g/cm$^3$.

Example 11 of British Patent Specification No. 1,355,245 describes an ethylene/propylene copolymer, having a density of 0.938 g/cm$^3$, a melt index equal to 1 dg/min and a molecular weight equal to 50,000. However, this copolymer does not technically fulfill an existing need for ethylene-based copolymers having a density between 0.933 and 0.946 g/cm$^3$ and possessing improved characteristics of resistance to cracking, traction impact and break elongation in the industry for the conversion of plastics materials by the methods of rotation moulding and injection. Copolymers having these properties form the object of the present invention.

Specifically, the present invention consists of copolymers based on ethylene and propylene and having a density of between approximately 0.933 and 0.946 g/cm$^3$, and a melt index of between 2 and 10 dg/min, characterized in that they possess from 3 to 27 alkyl groups per 1000 carbon atoms in the molecule and that their density $\rho$ and the proportion m of alkyl groups in the molecule satisfy the relationship:

$$0.9480 \leq \rho + 0.71 \, m \leq 0.9525.$$

The term "copolymer based on ethylene and propylene," within the meaning of the invention, identifies copolymers in which ethylene and propylene units are the quatitatively most important monomer units, without necessarily being the only monomer units present. In particular, the copolymers according to the invention may optionally comprise units, at the rate of up to 2 molar percent, derived from other α-olefin monomers, copolymerizable with ethylene, such as, for example, 1-butene, 1-pentene, 1-hexene etc. The present invention particularly comprises ethylene/propylene/1-butene terpolymers, which can advantageously be produced as indicated below.

Accordingly, with their proportion of alkyl groups in the molecule, the copolymers of the invention generally comprise from 95 to 99% of units derived from ethylene.

The copolymers according to the invention may be characterized, in addition, by a molecular weight Mn of between 10,000 and 28,000, approximately, and by a molecular distribution, expressed by a ratio of Mw/Mn of the weight average molecular weight to the number average molecular weight-called the polydisperse index-of between 4 and 8, approximately.

The copolymers according to the invention are favorably transformed into finished objects of improved quality by techniques such as rotation moulding and injection because they possess the following characteristics:
- a break elongation at least equal to 1000% and commonly capable of reaching up to 1500%, measured according to ISO Standard R 527;
- a break resistance higher than 200 kgf/cm$^2$ and commonly capable of reaching up to 300 kgf/cm$^2$, measured according to ASTM Standard D 882-67;
- a crack resistance higher than 15 hours and commonly capable of reaching up to 50 hours, measured according to ASTM Standard D 1693-70;
- a traction impact higher than 100 kg cm/cm$^2$ and commonly capable of reaching up to 160 Kg cm/cm$^2$, measured according to DIN Standard 53 448.

BRIEF DESCRIPTION OF THE DRAWING

The relationship between $\rho$ and m is diagrammatically represented in the sole FIGURE attached, showing the graph of density (on the ordinate) and of the proportion of alkyl groups (on the abscissae) of ethylene/propylene copolymers. In this FIGURE, the shaded portion A represents the whole of the copolymers according to the invention, point B represents the copolymer described in Example 11 of British Patent Specification No. 1,355,245 and point C represents a commercial copolymer, studied in Example 6 below.

A process for the production of the copolymers according to the invention consists in feeding a flux comprising from 80 to 95% by weight of ethylene and from 5 to 20% by weight of propylene into at least one reactor in stationary operation, the reactor having at least one reaction zone and copolymerizing the ethylene and propylene in the reactor at a pressure of from 300 to 2500 bar and a temperature of from 180° to 320° C. in the presence of a Ziegler type catalyst system, the catalyst system comprising at least one activator, selected from the group consisting of a hydride and an organometallic derivative of a metal of Groups I to III of the Periodic System, and at least one halogenated compound of a transistion metal of Groups IVb to VIb of the Periodic System.

Figure 1:
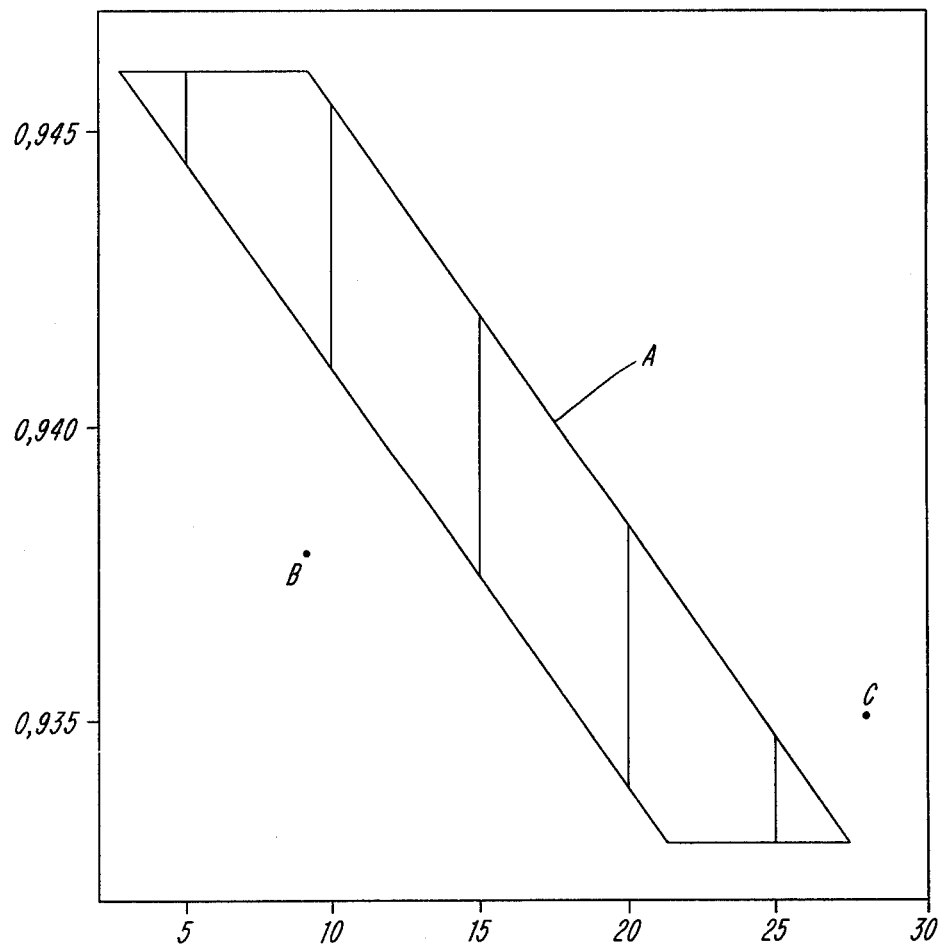

The halogenated transition metal compound may comprise a complex compound, having the formula

in which M is a metal selected from among titanium and vanadium, X is a halogen, R is a hydrocarbon radical, $2 \leq a \leq 3$, $2 \leq y \leq 20$, $0 \leq z \leq \frac{1}{3}$ and $0 \leq b \leq 1$. A complex compound of this type can be prepared by reducing titanium tetrachloride or vanadium tetrachloride by an organo-magnesium compound RMgX. By this method, a complex compound, in which $0 \leq b \leq 1$ is formed. Other illustrative methods for producing a complex compound of this type in which b=0 include (1) reduction of titanium tetrachloride or vanadium tetrachloride by aluminium in the presence of a magnesium halide; (2) joint milling of violet titanium trichloride, having the formula TiCl$_3$.$\frac{1}{3}$(AlCl$_3$), or of vanadium trichloride with an anhydrous magnesium halide; and (3) reduction by an alkylaluminium of either titanium tetrachloride or vanadium tetrachloride, absorbed on an anhydrous magnesium halide.

The halogenated transition metal compound can also consist of the catalyst described in European Patent Application, published under No. 0 005 394 and incorporated specifically by reference herein, which is obtained by contacting
(a) a magnesium compound containing at least one group selected from among the monohalides MgX, the hydrohalides HMgX and the hydride MgH$_2$, and
(b) at least one halide of a transition metal selected from among titanium and vanadium, the valency of the metal in the halide being lower than, or equal to, 3.

The halogenated transition metal compound can also correspond to the catalyst component described in European Patent Application published under No. 0 025 761 and incorporated specifically by reference herein, which has the formula $(MX_a)(MgX_2)_b(RMgX)_c(HMgX)_d$, in which M is a metal of Groups IVb and Vb of the periodic System, X is a halogen, R is a hydrocarbon radical, $2 \leq a \leq 3.5$, $1 \leq b \leq 30$, $1 < c \leq 8$ and $0 \leq d \leq 10$.

Finally, the halogenated transition metal compound can have the formula $(TiCl_3.\frac{1}{3}AlCl_3)(MCl_3)_x (MgX_2)_y$, in which $0.3 \leq x \leq 3$, $0 \leq y \leq 20$, M is a transition metal of Groups Vb and VIb of the Periodic System and X is a halogen.

The process according to the invention does not exclude the halogenated transition metal compound from comprising, apart from one of the compounds having a formula specified above, one or several other compounds, such as, in particular, vanadium trichloride or titanium trichloride, the latter being capable of joint crystallization with aluminium chloride in the form of $TiCl_3.\frac{1}{3}AlCl_3$. In that case it will generally be advantageous to use this or these compounds in a different reactor (or in a different reaction zone) than the reactor (or the reaction zone) in which the complex compound is being used.

The proportions of the activator and of the halogenated transition metal compound will be chosen so that the atomic ratio of activator metal to transition metal will lie between 0.5 and 20. The halogen X is preferably selected from among fluorine, chlorine and bromine. The radical R is preferably selected from among saturated aliphatic radicals (methyl, ethyl, propyl, n-butyl), unsaturated aliphatic radicals (allyl) and aromatic radicals (phenyl).

The use of the complex compounds, having the formula specified above, is well suited to the whole temperature range of the process according to the invention. Of course, those skilled in the art will take care in selecting the other ingredients of the catalyst system according to their thermal stability and their reactivity towards ethylene at the temperature chosen. Similarly, the retention time of the catalyst system will be chosen by those skilled in the art according to the temperature of the reaction zone, in which it is used, and will generally lie between approximately 5 and 80 seconds. The higher the temperature at which the catalyst is being used, the shorter the reaction time will be.

The composition of the gaseous flux feeding the reactor in stationary operation, by which the process according to the invention is characterized, should be taken as a mean composition over the whole of the reactor, it being understood that this composition is not necessarily uniform and can vary along the reactor, particularly when the latter comprises several zones. It is even possible that in the case of a reactor comprising several zones, a gaseous flux feeding one of the zones may have a zero content of propylene, whereas the fluxes feeding the other zones have sufficiently high propylene contents to reach the mean composition that is characteristic of the process according to the invention.

Those skilled in the art will easily select this mean composition from the proposed range according to the desired density of the coplymer. As a rule, the propylene content of this composition will be increased if lower density is desired.

The process according to the invention can be carried out by copolymerizing ethylene and propylene in the presence of a hydrocarbon, such as propane, butane, etc., employed at the rate of up to 50% by weight. In order to control accurately the melt index of the copolymer, it can also be advantageous to effect copolymerization in the presence of up to 2 molar percent of hydrogen. Finally, with a view to applying the process according to the invention to the production of terpolymers, as specified above, it is also possible to effect copolymerization in the presence of a minor quantity, ranging up to 10% by weight, of another $\alpha$-olefin, such as 1-butene, 1-hexene, etc. The process according to the invention is carried out continuously, using autoclave reactors or tubular reactors, as is usual in the technology of ethylene polymerization under high pressure.

The invention will be more readily understood in the light of the following examples, given for the purpose of illustration.

EXAMPLES 1 AND 2

Ethylene and propylene are copolymerized in a cylindrical autoclave reactor, kept at a pressure of 1200 bars and comprising four reaction zones, the temperatures of which are respectively maintained at 185° C., 215° C., 250° C. and 275° C. The catalyst system used comprises, on the one hand, a compound having the formula $TiCl_3.\frac{1}{3}AlCl_3.6\ MgCl_2$, and, on the other hand, dimethyldiethylsiloxalane as activator, the atomic ratio Al/Ti being equal to 3. Copolymerization is effected in the presence of, respectively, 0.1% (Example 1) and 0.2% (Example 2) by volume of hydrogen. The flux feeding the reactor in stationary operation consists of:

93% by weight of ethylene and 7% by weight of propylene for Example 1,

82% by weight of ethylene and 18% by weight of propylene for Example 2.

The macromolecular structure of the copolymers obtained is analyzed conventionally by infra-red spectrophotometry and gel permeation chromatography methods. In this way, the molecular content of ethylene, propene and, possibly, 1-butene units is measured on the one hand, and, on the other hand, the polydisperse index $M_w/M_n$ is measured. Also the melt index M.i. of the copolymers is measured according to ASTM Standard D 1238-73 and their density $\rho$, expressed in $g/cm^3$.

Subsequently, compression-moulded plates are prepared from these copolymers, in order to measure the break resistance B.R. according to ASTM Standard D 882-67, expressed in $kgf/cm^2$, the break elongation B.E. according to ISO Standard R 527, expressed in %, and the crack resistance under strain of 50 $kg/cm^2$, hereinafter denoted by $F_{50}$, according to ASTM Standard D 1693-70, expressed in hours. Also notched test-pieces are prepared by injection moulding, intended for the measurement of the traction impact resistance, hereinafter denoted by T.I., according to DIN Standard 53 448, expressed in $kg\ cm/cm^2$.

The whole of the results of these measurements is reported in the table below.

EXAMPLE 3

Ethylene and propylene are copolymerized in the presence of 0.16% by volume of hydrogen in a cylindrical autoclave reactor, kept at a pressure of 900 bar and comprising three reaction zones, the temperatures of which are respectively maintained at 220° C., 240° C.

and 285° C. The catalyst system used comprises, on the one hand, a compound having the formula TiCl$_3$.⅓AlCl$_3$.6 MgCl$_2$, and, on the other hand, dimethylethyldiethylsiloxalane as activator, the atomic ratio Al/Ti being equal to 4.8. The flux feeding the reactor in stationary operation consists of 82% by weight of ethylene and 18% by weight of propylene.

The macromolecular structure, the melt index and the density of the copolymer obtained are determined as in the preceding examples. It is observed that the working conditions permit dimerisation in situ of ethylene and lead to the formation of an ethylene/propylene/1-butene terpolymer. The various dynamometric and mechanical properties, reported in the table below, are also measured on moulded plates and test-pieces, prepared from this terpolymer, according to the methods described for the preceding examples.

EXAMPLE 4

Ethylene and propylene are copolymerized in the presence of 0.4% by volume of hydrogen in a cylindrical autoclave reactor, kept at a pressure of 1900 bar and comprising three reaction zones, the temperatures of which are respectively maintained at 215° C., 250° C. and 280° C. The catalyst system used comprises, on the one hand, a compound having the formula TiCl$_3$.⅓AlCl$_3$.6 MgCl$_3$, and, on the other hand, trioctylaluminium as activator, the atomic ratio Al/Ti being equal to 3. The flux feeding the reactor in stationary operation consists of 88% by weight of ethylene and 12% by weight of propylene.

The macromolecular structure, the melt index, the density and the break elongation of the copolymer obtained are determined as in the preceding examples and indicated in the table below. The crack resistance according to ASTM Standard D 1693-70 is determined at constant deformation on injection-moulded plates.

EXAMPLE 5

The test of Example 3 above is reproduced, except for the hydrogen content (equal to 0.1% by volume) and for the flux feeding the reactor in stationary operation, which here consists of 86% by weight ethylene and 14% by weight propylene. As in Example 3 it is observed that the working conditions permit dimerisation in situ of ethylene and lead to the formation of an ethylene/propylene/1-butene terpolymer. The macromolecular structure, melt index, density and dynamometric and mechanical properties of the terpolymer obtained are indicated in the table below.

EXAMPLE 6 (comparative)

One contemplates a commercial copolymer ethylene/propylene having a molecular weight Mn equal to 12,000 and a proportion of alkyl groups in the molecule equal to 28 per 1000 carbon atoms. The macromolecular structure, melt index, density and polydisperse index of this copolymer are measured and indicated in the table below. It may be noticed that this copolymer is outside the field of the invention, as represented by point C of the attached FIGURE, while having a density and a melt index which make it comparative with the preceding examples.

As indicated in the Table below, several dynamometric and mechanical properties are measured on compression-moulded plates and test-pieces prepared from this copolymer, according to methods described in the preceding examples. The properties of the copolymers and terpolymers of the present invention, when compared to those of this commercial product, are obviously improved.

TABLE

| EXAMPLE | 1 | 2 | 3 | 4 | 5 | 6 |
| --- | --- | --- | --- | --- | --- | --- |
| % (moles) C$_2$H$_4$ | 98.5 | 95.2 | 96.7 | 97.0 | 96.8 | 94.4 |
| % (moles) C$_3$H$_6$ | 1.5 | 4.8 | 2.6 | 3.0 | 2.2 | 5.6 |
| % (moles) C$_4$H$_8$ | — | — | 0.7 | — | 1.0 | — |
| M.i. dg/min | 4.9 | 4.9 | 3.3 | 8.7 | 2.5 | 6.7 |
| C g/cm$^3$ | 0.945 | 0.934 | 0.938 | 0.941 | 0.940 | 0.935 |
| Mw/Mn | 7.8 | 5.6 | 6.1 | 4.2 | 4.9 | 8.8 |
| % B.E. | 1224 | 1000 | 1276 | 1090 | 1172 | 616 |
| F$_{50}$h | 16 | 19 | 19 | 50 | 16 | 1 |
| T.i. | 150 | 100 | 131 | — | 154 | 82 |
| B.R. | 253 | — | 263 | — | 299 | 106 |
| m/1000 C | 7.5 | 24 | 16.5 | 15 | 16 | 28 |

I claim:

1. An ethylene-propylene copolymer, having a density of between 0.933 and 0.946 g/cm$^3$ and a melt index of between 2 and 10 dg/min, wherein said copolymer has from 3 to 27 alkyl groups per 1000 carbon atoms in the molecule and wherein its density $\rho$ and its proportion m of alkyl groups in the molecule satisfy the relationship: $0.948 \leq \rho + 0.71$ m $\leq 0.9525$.

2. A copolymer according to claim 1, wherein said copolymer further comprises units derived from $\alpha$-olefinic monomers copolymerizable with ethylene.

3. A copolymer according to claim 1 or 2, wherein the molecular weight Mn of said copolymer is between 10,000 and 28,000.

4. A copolymer according to claim 1, wherein the polydisperse index of said copolymer is between 4 and 8.

5. A copolymer according to claim 1, wherein the break elongation of said copolymer, measured according to ISO Standard R 527, is at least equal to 1000%.

6. A copolymer according to claim 1, wherein the break resistance of said copolymer, measured according to ASTM Standard D 882-67, is higher than 200 kgf/cm$^2$.

7. A copolymer according to claim 1, wherein the crack resistance of said copolymer, measured according to ASTM Standard D 1693-70, is higher than 15 hours.

* * * * *